UNITED STATES PATENT OFFICE.

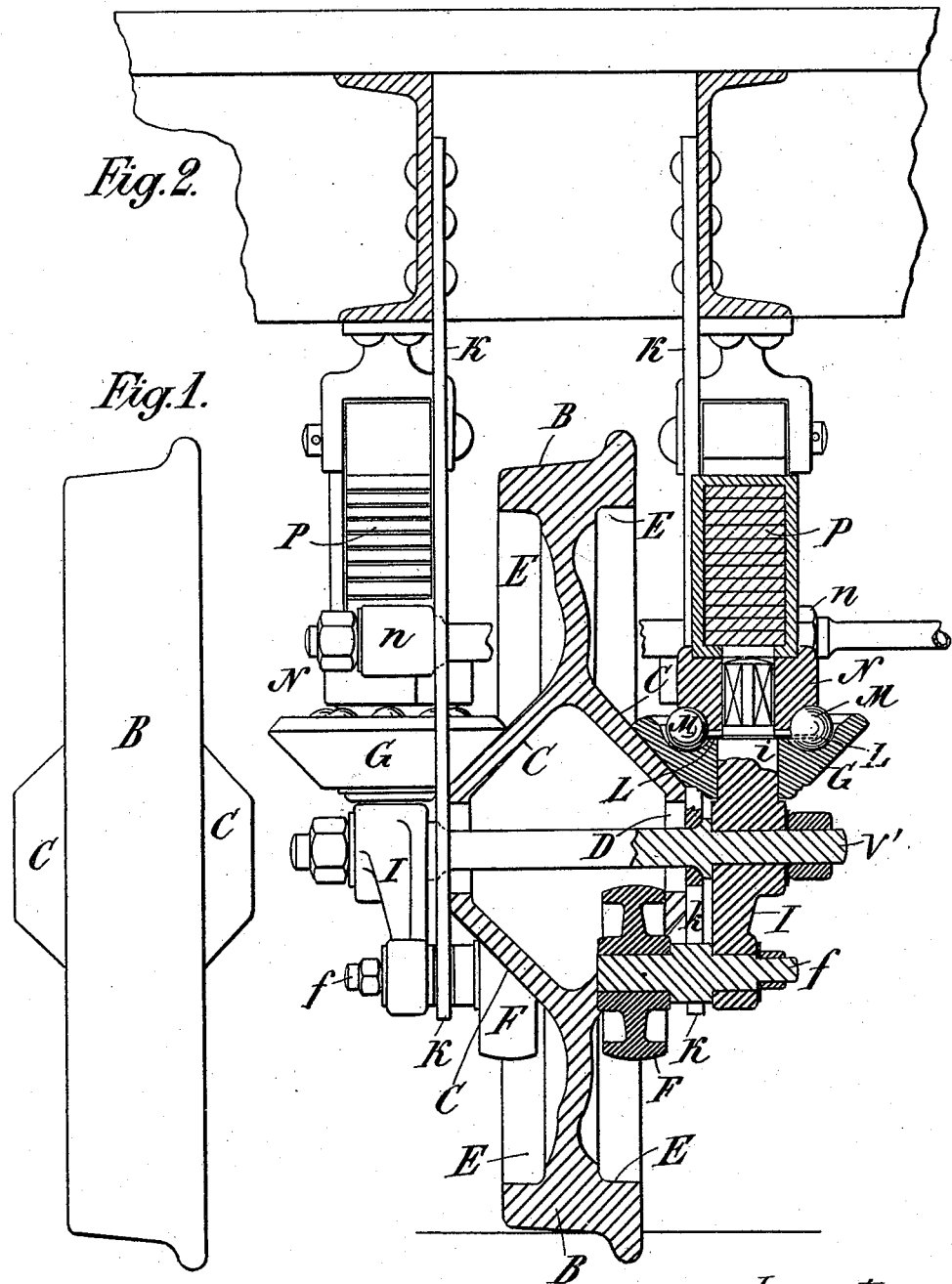

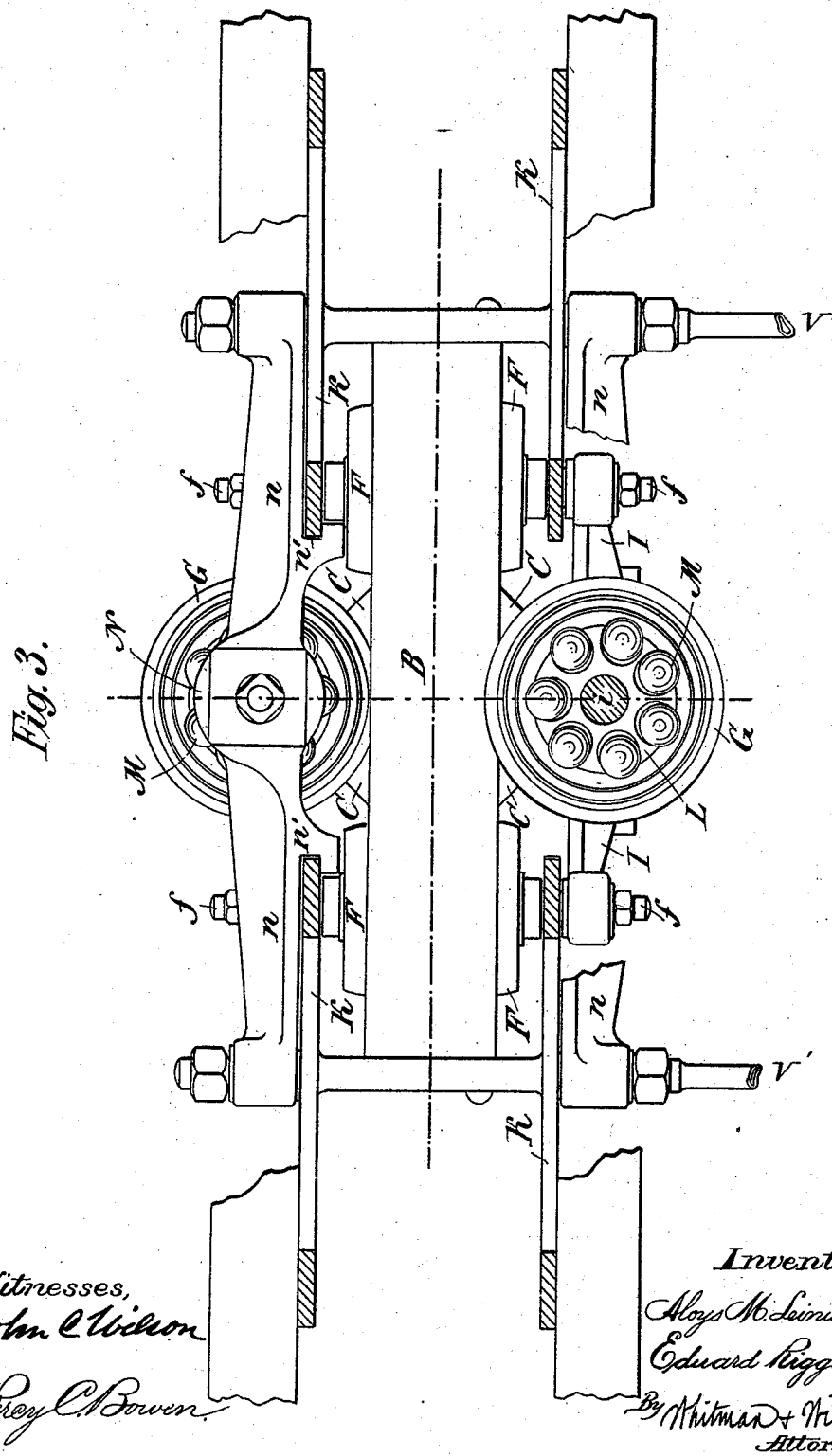

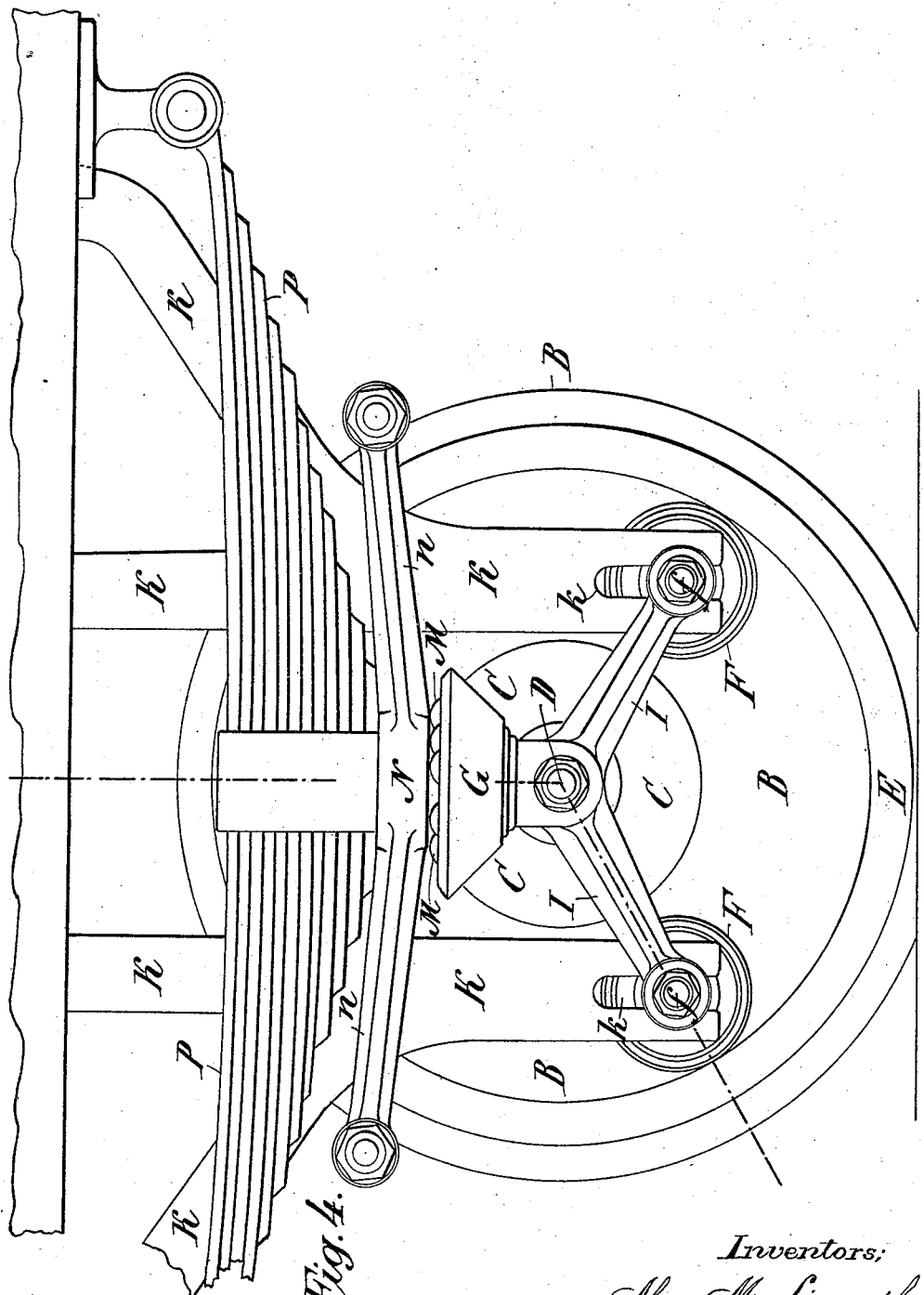

ALOYS MARIA LEINWATHER AND EDUARD RIGGENBACH, OF BASLE, SWITZERLAND.

CAR-TRUCK.

SPECIFICATION forming part of Letters Patent No. 491,897, dated February 14, 1893.

Application filed November 3, 1892. Serial No. 450,896. (No model.)

*To all whom it may concern:*

Be it known that we, ALOYS MARIA LEINWATHER, a subject of the Emperor of Austria-Hungary, and EDUARD RIGGENBACH, a citizen of Switzerland, and both residents of the city of Basle, of Switzerland, have invented certain new and useful Improvements in Car-Wheels, of which the following is a specification.

In car wheels as heretofore constructed the load rests upon the wheel through the medium of the axle which also serves to guide the wheel. Thus the load to be put on the wheel depends on the strength of the axle. In these old constructions the bearing strength of the wheels can not be fully utilized, whereas according to the present invention the axle is entirely dispensed with and the load bears directly upon the body of the wheel, the latter being guided by an automatic device hereinafter described.

In the accompanying drawings: Figure 1 is a front view of the wheel alone. Fig. 2 is a front view of the wheel and other parts partly in section. Fig. 3, is a plan, some parts being removed or broken away in order to show others more clearly. Fig. 4 is a side elevation.

The body B of the improved wheel has a conical hub C on each side and a hole D in its center. The inner surface E of the rim of the wheel at both sides of the same forms the rolling path for two pairs of guiding rollers F. A cone G bears on each of the conical hubs C at either side of the wheel. The cones G revolve on pivots $i$ secured to or forming part of double brackets I, at the outer ends of which the rollers F are journaled, which serve to guide the wheel. The guide roller spindles $f$ pass through elongated vertical slots $k$ at the lower ends of brackets K secured to the frame of the car.

On each pivot $i$ a star-shaped disk L is mounted which serves to hold apart the antifriction balls M placed between the ball bearing N and the cone G on each side of the wheel. The square or polygonal heads of the pivots $i$ enter into the ball bearings N and prevent them from revolving. The ball bearings N serve also as spring shackles and hold the springs P in place. The brackets K work also in guides $n'$ Fig. 3 in arms $n$ extending from the ball bearings N. These arms $n$ of the two ball bearings N of each wheel are connected with each other and with those of the corresponding wheel on the opposite side of the car by transverse rods V. The two brackets I of each wheel are connected by a bolt V' passing through the central hole D in the wheel.

We claim—

1. The combination with a car wheel, and conical hubs on both sides thereof, of conical disks one on each side of the wheel resting upon the said conical hubs, antifriction bearings between the truck and the conical disks, and means for retaining the wheel under the disks, substantially as described.

2. The combination with a car wheel, and conical hubs on both sides thereof, of conical disks one on each side of the wheel resting upon the said conical hubs, antifriction bearings between the truck and the conical disks, and rollers journaled on the truck to bear against the inner side of the rim of the wheel and retain the latter in position, substantially as described.

3. In combination with the wheel B, the brackets I carrying the guide-rollers F whose spindles $f$ are guided in slots $k$ at the ends of the brackets K.

4. In combination with wheel B the ball bearings N with frame $n$.

5. The combination, with a car wheel, and conical hubs on both sides thereof, of conical disks one on each side of the wheel resting upon the said conical hubs, ball bearings to the said disks, a frame $n$ resting upon the ball bearings, brackets below the conical disks, and rollers journaled on the said brackets to retain the wheel in position, substantially as described.

6. The combination with a car wheel and conical hubs thereon, of conical disks, a frame $n$ to which the said disks are secured by antifriction bearings, springs interposed between the frame and the truck, brackets carrying rollers F, and brackets K extending from the truck and having guide slots through which the spindles of the rollers F pass, substantially as and for the purposes described.

In testimony whereof we have affixed our signatures in presence of two witnesses.

ALOYS MARIA LEINWATHER.
EDUARD RIGGENBACH.

Witnesses:
  CLARENCE GIFFORD,
  GEORGE GIFFORD.